F. H. WEATHERLY.
PIPE JOINT.
APPLICATION FILED MAR. 7, 1910.

1,006,031.

Patented Oct. 17, 1911.

Witnesses
H. O. Van Antwerp.
Georgiana Chace

Inventor
Frank H. Weatherly
By Luther V. Moulton
Attorney

UNITED STATES PATENT OFFICE.

FRANK H. WEATHERLY, OF GRAND RAPIDS, MICHIGAN.

PIPE-JOINT.

1,006,031. Specification of Letters Patent. Patented Oct. 17, 1911.

Application filed March 7, 1910. Serial No. 547,866.

*To all whom it may concern:*

Be it known that I, FRANK H. WEATHERLY, a citizen of the United States of America, residing at Grand Rapids, in the county of Kent and State of Michigan, have invented certain new and useful Improvements in Pipe-Joints; and I do hereby declare the following to be a full, clear, and exact description of the invention, such as will enable others skilled in the art to which it appertains to make and use the same.

My invention relates to improvements in pipe joints, and more particularly to joints adapted to permit detachment of a portion of a pipe for the purpose of cleaning the same and for gaining access to the same without in any wise disturbing the position of the remainder of the pipe.

The object of my invention is to permit the removal of a portion of the pipe line without in any wise disturbing or moving the remainder of the same, and to enable the joint to be effectually packed when the removed portion is replaced.

Figure 1:
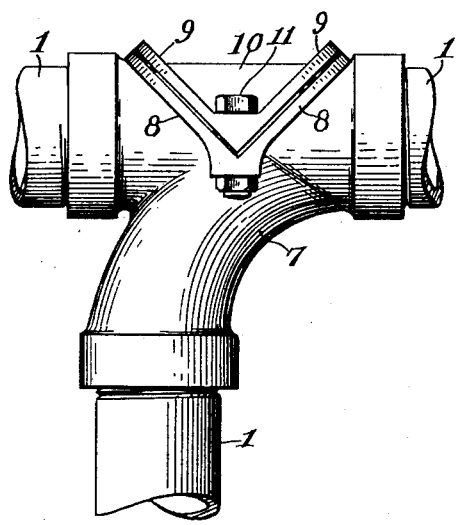
Figure 2:
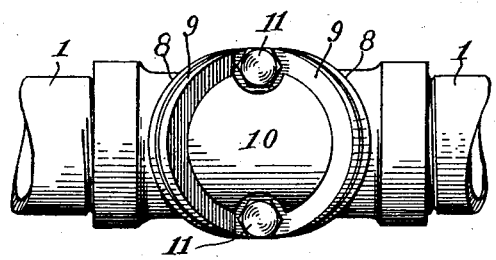

My invention consists essentially of a removable portion in one side of the pipe and having joints or flanges in oppositely inclined planes joined at an angle and arranged diagonally to the axis of the pipe the angle being near the plane of the said axis so that a portion of one side of the pipe may be removed laterally without disturbing the position of the adjacent parts of the pipe, the essential feature being the diagonally arranged joints in planes inclined in opposite directions and uniting at an angle near the plane of the axis of the pipe, as will more fully appear by reference to the accompanying drawings, in which:

Figure 1 is a plan view of a portion of a pipe having a branch or T, and with my invention applied thereto; and Fig. 2 the same viewed at right angles to Fig. 1.

Like numbers refer to like parts in both of the figures.

1 represents a portion of a line of pipe having a branch or T 7 therein. Opposite this branch or T, or at any other place where access to the interior of the pipe is desirable a removable portion 10 in the side of the pipe is provided. This removable portion has flanges 9 arranged in oppositely inclined planes transversely of the pipe and joined at an angle near the plane of the axis of the pipe. Opposing flanges 8 are formed at the margin of the opening in the side of the pipe closed by the removable portion 10. These flanges being in parallel planes are easily and securely packed and are preferably secured to each other by bolts extending through reinforced portions at the angles and arranged transversely to the axis of the pipe. By this construction the portion 10 is easily removed to gain access to the interior of the pipe or branch and readily replaced, securely packed at the joint, and when in place forms a continuous smooth interior to the pipe.

What I claim is:

1. A pipe, provided with a removable portion in one side, flanges on the margin of said portion arranged in oppositely inclined planes and joined at their adjacent ends at an angle, opposing flanges on the pipe parallel with the flanges on the removable portion a packing between the flanges and means for securing the removable portion in place.

2. A pipe, provided with a removable portion in one side flanges on the edge of said removable portion arranged in oppositely inclined planes and joined on an angle near the plane of the axis of the pipe opposing flanges on the pipe at the margin of the opening closed by said removable portion, reinforcements at the angles of the flanges, and bolts extending through said reinforcements at substantially right angles to the axis of the pipe.

In testimony whereof I affix my signature in presence of two witnesses.

FRANK H. WEATHERLY.

Witnesses:
 PALMER A. JONES,
 LUTHER V. MOULTON.

---

Copies of this patent may be obtained for five cents each, by addressing the "Commissioner of Patents, Washington, D. C."